(12) United States Patent
Carver et al.

(10) Patent No.: US 6,408,866 B1
(45) Date of Patent: Jun. 25, 2002

(54) FLUIDIC OSCILLATOR, PART DESIGNED TO BE INCORPORATED IN A FLUIDIC OSCILLATOR AND METHOD FOR MAKING SUCH A FLUIDIC OSCILLATOR

(75) Inventors: Andrew Carver, Seneca, SC (US); Luc Hernoux, Cisse (FR)

(73) Assignee: Schlumberger Industries, S.A., Montrouge (FR)

( * ) Notice: Subject to any disclaimer, the term of this patent is extended or adjusted under 35 U.S.C. 154(b) by 0 days.

(21) Appl. No.: 09/719,604

(22) PCT Filed: Jun. 8, 1999

(86) PCT No.: PCT/EP99/03955

§ 371 (c)(1),
(2), (4) Date: Feb. 26, 2001

(87) PCT Pub. No.: WO99/66214

PCT Pub. Date: Dec. 23, 1999

(30) Foreign Application Priority Data

Jun. 17, 1998 (FR) ............................................. 98 07675

(51) Int. Cl.⁷ ................................................. G01F 1/20
(52) U.S. Cl. .................... 137/15.01; 137/269; 137/826; 137/833; 137/315.01
(58) Field of Search ................................. 137/826, 833, 137/269, 315.01, 15.01, 842; 29/890.09

(56) References Cited

U.S. PATENT DOCUMENTS

| | | | | |
|---|---|---|---|---|
| 3,815,199 A | * | 6/1974 | Malavazos | ................ 29/890.09 |
| 4,843,889 A | * | 7/1989 | Mansy et al. | ............ 73/861.19 |
| 5,396,808 A | * | 3/1995 | Huang et al. | ............ 73/861.19 |
| 5,638,867 A | * | 6/1997 | Huang | ......................... 137/826 |
| 5,983,943 A | * | 11/1999 | Parry et al. | .................. 137/826 |

* cited by examiner

Primary Examiner—A. Michael Chambers
(74) Attorney, Agent, or Firm—Straub & Pokotylo; Michael P. Straub

(57) ABSTRACT

The invention provides a fluidic oscillator that is symmetrical about a longitudinal plane of symmetry (P), comprising an enclosure defining an oscillation chamber and having an inlet opening and an outlet opening through which the fluid flows and which are in alignment in said plane (P) in a "longitudinal" first direction (A), said inlet opening being made in the form of a slot that is narrow in a second direction (B) extending transversely to said plane (P) and elongate in a third direction (C) parallel to said plane (P) and perpendicular to said longitudinal first direction (A), wherein said slot is provided in an insert which is removable from said enclosure.

14 Claims, 6 Drawing Sheets

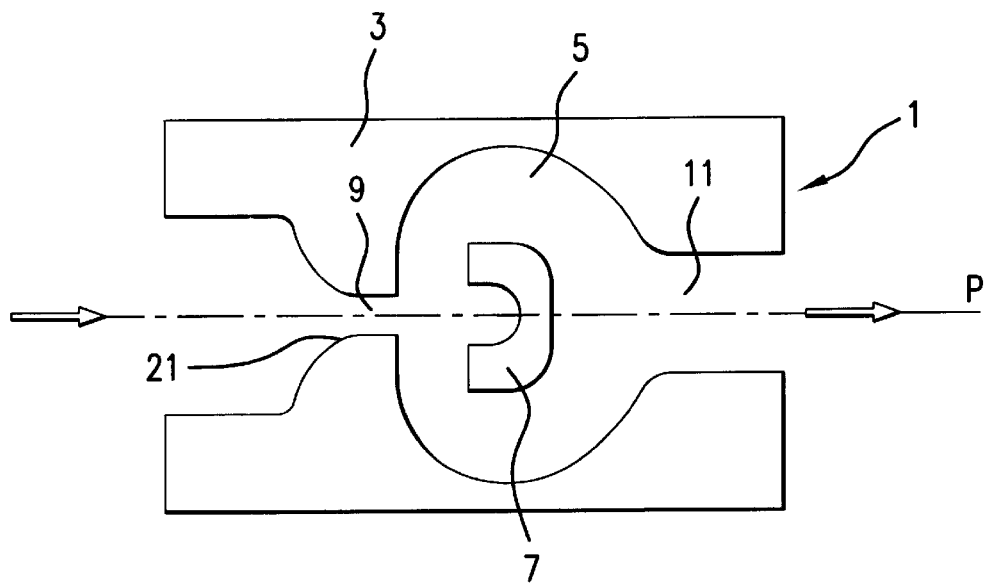
FIG. 1
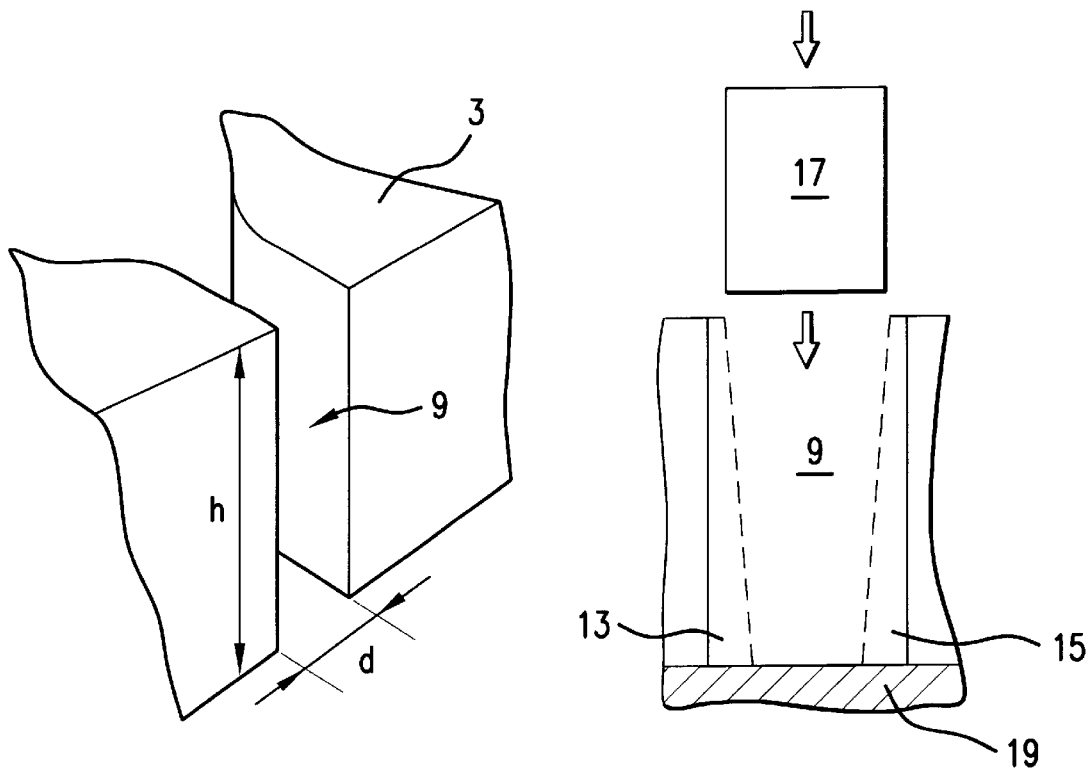
FIG. 2
FIG. 3

FLUIDIC OSCILLATOR, PART DESIGNED TO BE INCORPORATED IN A FLUIDIC OSCILLATOR AND METHOD FOR MAKING SUCH A FLUIDIC OSCILLATOR

The invention relates to a fluidic oscillator that is symmetrical about a longitudinal plane of symmetry P comprising an enclosure defining an oscillation chamber and having an inlet opening and an outlet opening through which the fluid flows, which openings are in alignment in said plane P in a "longitudinal" direction, said inlet opening being implemented in the form of a slot that is narrow in a direction transverse to said plane P, and elongate in a direction contained in said plane P and perpendicular to said longitudinal direction.

Fluidic oscillators are well known. Document EP 0 381 344 describes a fluidic oscillator operating on the basis of the Coanda effect. The jet coming from an inlet nozzle followed by an inlet channel attaches itself spontaneously to one of the side walls and flows along first and second main channels. A portion of the flow coming from the inlet channel is bled off by a reaction channel. This has the effect of detaching the jet from said wall and of causing it to attach to the opposite wall. The phenomenon repeats, thus giving rise to continuous oscillation in the incoming flow. The flow in the first and second main channels and in the reaction channel varies at a frequency that depends on the incoming flow rate. FIG. 1 shows an example of a fluidic oscillator as seen from above.

The oscillator 1 is symmetrical about a longitudinal plane of symmetry P and comprises an enclosure 3 defining an oscillation chamber 5 and an obstacle 7 received therein.

The enclosure 3 has an inlet opening 9 and an outlet opening 11 in alignment in the plane P with the fluid flowing through them in the direction indicated by arrows in the figure.

The inlet opening 9 is in the form of a slot of transverse size or "width" l that is small compared with a longitudinal dimension thereof referred to as its "height" h and which lies in a plane perpendicular to the plane of FIG. 1 (see FIG. 2).

Conventionally, the width l is equal to about one-fifth of the height h.

This slot serves to transform a fluid flow into a jet of fluid that oscillates transversely in a plane perpendicular to the plane P, i.e. in a plane parallel to that of FIG. 1.

To obtain good metrological performance from an oscillator, it is necessary for the oscillation of the fluid jet to be under control, and in particular for the dimensions of the slot 9 to be accurately determined during manufacture of said fluidic oscillator.

The piece shown in FIG. 1 is made of aluminum, for example, and it is manufactured by operations of molding and of unmolding.

Nevertheless, it is not possible to make the piece directly with the desired dimensions merely by the operations of molding and unmolding.

Thus, a piece which has just been unmolded is subsequently machined in order to obtain the desired precision for its dimensions, and in particular for the dimensions of the slot 9.

The machining performed in particular on the slot 9 of the piece as unmolded is as shown in front view in FIG. 3.

In this figure, side portions 13 and 15 of the slot 9 as shown in dashed lines define the traditional tapering profile obtained after unmolding.

The machining operation then consists in eliminating the dashed-line portions 13 and 15 by means of a tool 17 such as a cutter which is inserted in the slot from above (as shown in FIG. 3) or through the opening that opens out into the oscillation chamber 5.

Nevertheless, since the slot is elongate in its height direction h and of narrow width l, the cutter 17 must be fine (e.g. having a diameter of 16 mm so as to give a width l equal to 19 mm), and as a result it is not strong enough mechanically.

Because of the fineness of the cutter, it can be subjected to mechanical vibration while it is being used, and as a result the surface state of the inside portion of the slot is not fully under control over its entire height, and in particular at the bottom thereof, i.e. close to the portion referenced 19 in FIG. 3.

In addition, because of its fineness, the cutter runs the risk of being damaged while it is in use. To avoid such damage, it is recommended to slow down the rate of machining, but that increases the duration of the machining operation and thus increases the economic cost thereof.

Such measures are difficult to accept in an industrial environment.

Furthermore, while machining, when the cutter leaves the slot via the upstream portion thereof (represented by reference 21 in FIG. 1) traveling in the direction opposite to the arrows in said figure, the tolerances on this portion coming directly from unmolding are poorly controlled.

This can be harmful since the conditioning of the fluid flow in this region must be fully controlled.

OBJECTS AND SUMMARY OF THE INVENTION

The present invention seeks to remedy at least one of the above-mentioned problems.

The present invention thus provides a fluidic oscillator that is symmetrical about a longitudinal plane of symmetry P, comprising an enclosure defining an oscillation chamber and having an inlet opening and an outlet opening through which the fluid flows and which are in alignment in said plane P in a "longitudinal" first direction A, said inlet opening being made in the form of a slot that is narrow in a second direction B extending transversely to said plane P and elongate in a third direction C parallel to said plane P and perpendicular to said longitudinal first direction A, wherein said slot is provided in an insert which is removable from said enclosure.

Thus, the removable insert and the enclosure of the fluidic oscillator can be manufactured separately: the removable insert and most particularly the slot are manufactured with precision while the enclosure can be manufactured more approximately.

It suffices during the molding and unmolding operations to provide a cavity of large dimensions inside the enclosure at the site where the slot is to be placed and then to machine in approximate manner the walls of the enclosure defining said cavity with a tool of larger dimensions than the tool used in the prior art.

The time required for machining the enclosure is thus reduced and the risk of damaging the tool is avoided.

More precisely, the removable insert has two side walls elongate in the third direction C and spaced apart in the second direction B so as to define between them the dimension of said slot in said second direction, and also referred to as its width l.

The removable insert may have two endpieces perpendicular to the third direction C and located at the two opposite ends of said side walls so as to define between said endpieces the size of the slot in the third direction, also referred to as its height h.

According to a characteristic of the invention, the removable insert is inserted in a cavity provided in the enclosure and of a transverse size d slightly greater than that of said insert.

Advantageously, the removable insert has a groove formed in a peripheral zone of said insert and contained in a transverse plane defined by the second and third directions, said peripheral groove being designed to receive a sealing member co-operating in particular with the walls of the enclosure which define the cavity.

In another embodiment of the invention, the side walls of the removable insert run into respective walls of the enclosure via at least one of their portions and they also extend beyond said portions in the "longitudinal" first direction so as to project into the oscillation chamber.

Thus, the walls projecting into the oscillation chamber serve to protect the fluid jet formed in the slot from external influences that could disturb the oscillation of said jet.

Advantageously, two corresponding sites are formed respectively on each of the endpieces upstream from the slot for the purpose of receiving an element which is suitable for modifying the speed profile of the fluid flow upstream from said slot.

The invention also provides an insert for incorporation in a fluidic oscillator as described above, said part comprising two side walls that are elongate in a direction C and that are spaced apart in a direction B perpendicular to the direction C in such a manner as to define a slot between them in said direction B.

The insert may have two endpieces perpendicular to the direction C and disposed at the two opposite ends of the side walls in such a manner as to define between said endpieces the size of the slot in said direction C.

Advantageously, a groove is formed in a peripheral zone of said insert and is contained in a plane defined by the first and second directions and, said groove being designed to receive a sealing member.

The side walls extend in a direction A perpendicular to a plane defined by the directions B and C in such a manner as to project into the oscillation chamber of the fluidic oscillator when said insert is incorporated therein.

The invention also provides a method of manufacturing a fluidic oscillator that is symmetrical about a longitudinal plane of symmetry P, the oscillator comprising an enclosure defining an oscillation chamber and having an inlet opening and an outlet opening through which the fluid flows and which are in alignment in said plane P in a "longitudinal" first direction, said inlet opening being made in the form of a slot which is narrow in a second direction extending transversely to said plane P and elongate in a third direction parallel to said plane P and perpendicular to said longitudinal first direction, wherein the method consists in making said enclosure by forming therein a cavity of transverse size greater than the transverse size of said slot, in manufacturing separately an insert and forming therein said slot, and in inserting said insert in said cavity.

More precisely, the method of the invention consists in making the enclosure of the fluidic oscillator by operations of molding and unmolding and then machining the unmolded enclosure.

The method of the invention also consists in making the insert by operations of molding and of unmolding.

BRIEF DESCRIPTION OF THE DRAWINGS

Other characteristics and advantages appear from the following description given purely by way of non-limiting example and made with reference to the accompanying drawings, in which:

FIG. 1 is a diagrammatic plan view of a prior art fluidic oscillator;

FIG. 2 is a fragmentary perspective view on a larger scale showing the FIG. 1 fluidic oscillator with only its slot appearing in the figure;

FIG. 3 is a fragmentary front view on a larger scale of the slot shown in FIG. 2;

MORE DETAILED DESCRIPTION

Figure 4:
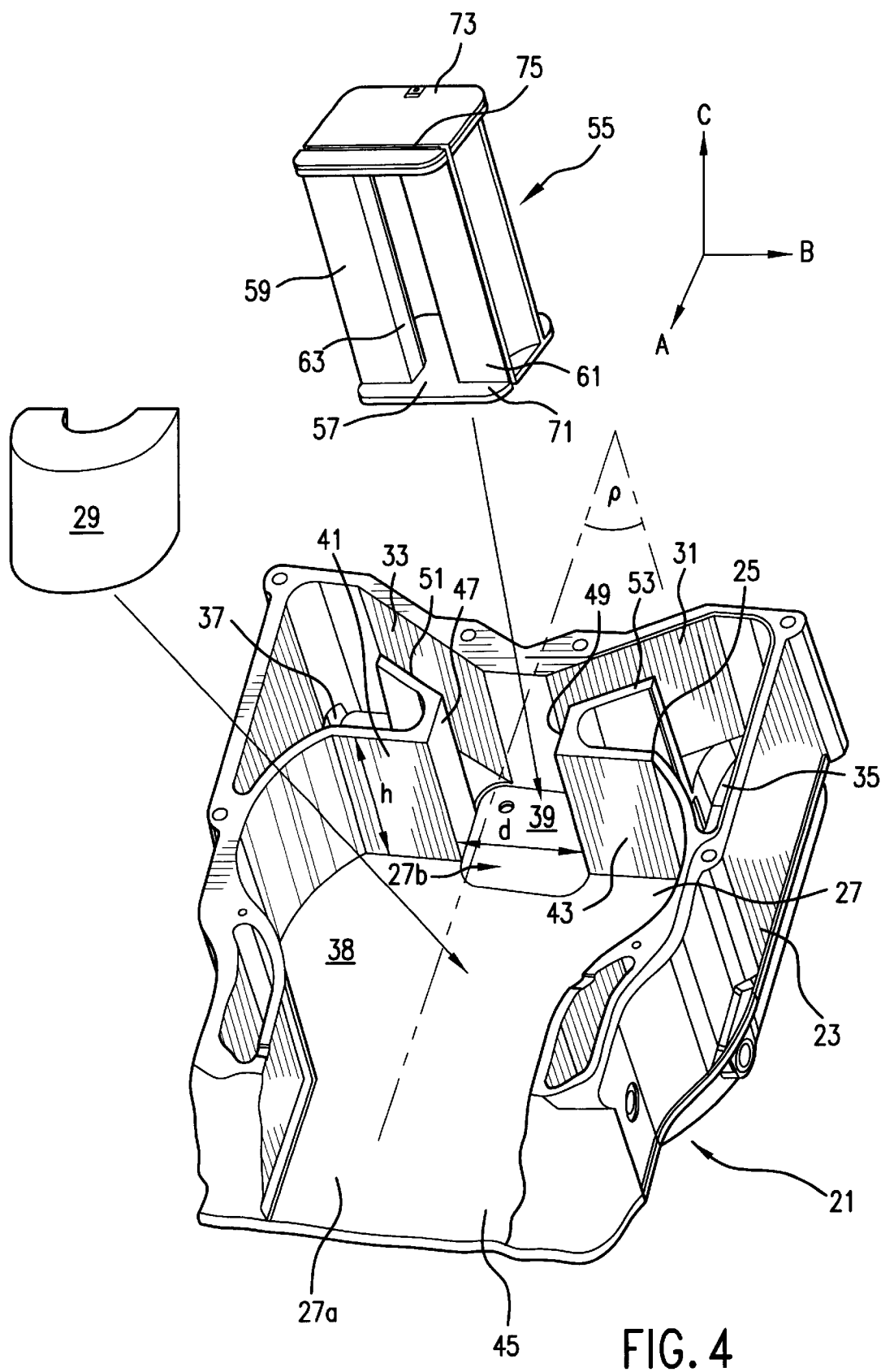
FIG. 4 is a perspective view of the inside of the central block of the fluidic oscillator, of the insert 55 with the slot formed therein, and of the obstacle 29, both the part and the obstacle being separate from said block.

As shown in FIG. 4 and given overall reference 21, a fluidic oscillator is implemented in the form of a central block 23 whose cover-forming top wall has been removed.

The central block of the fluidic oscillator is symmetrical about a longitudinal plane of symmetry P (FIG. 4).

The central block comprises an enclosure 25 which defines an oscillation chamber 27.

An obstacle 29 is designed to be positioned in the oscillation chamber at the position marked by the arrow.

The central block also has two passages 31 and 33 inclined in such a manner as to form a V-shape and each provided at one of its ends with a respective orifice 35, 37 formed through the bottom wall 38 of said central block.

The flow of fluid passes through said orifices 35 and 37 and along the following passages 31 and 33 prior to penetrating into the oscillation chamber 27.

The passages 31 and 33 open out into a cavity 39 which is defined in particular by the side walls 41 and 43 of the enclosure 25.

From a "downstream" end 27a of the oscillation chamber 27, the side walls 41 and 43 extend parallel to each other and to the plane P, and then move away from said plane P so as to give the chamber a bulging shape, after which they close towards the plane P, extending perpendicularly thereto until they reach an "upstream" opposite end 27b of the oscillation chamber.

The two ends 27a and 27b are in alignment in a "longitudinal" first direction A contained in the plane P.

At the end 27a of the oscillation chamber 27, the side walls 41 and 43 are parallel to the plane P and between them they define an outlet opening 45 through which the fluid flows out from the oscillation chamber 27.

At the end 27b of the oscillation chamber, the side walls 41 and 43 are spaced apart from each other in a second direction B extending transversely to the plane P and thus defining the width d of the cavity 39.

Thereafter, the side walls 41 and 43 extend parallel to the plane P in an upstream direction in the form of two wall portions 47 and 49 so as to define a fraction of the longitudinal dimension of the cavity 39, and they then move away from said plane P in directions that are inclined relative to the directions A and B so as to run into respective ones of the walls 51 and 53 defining the passages 31 and 33, respectively.

The side walls 41 and 43 have a "height" dimension h which is in alignment with a third direction C perpendicular to the first two directions A and B, and by way of example h can be equal to 91.3 mm.

During manufacture of the central block 23 of the fluidic oscillator, by molding and unmolding aluminum, for example, the side walls 41 and 43 and their extensions 47, 49 and 51, 53 are obtained with a conventional unmolding taper of the kind shown in dashed lines in FIG. 3.

The central block is then machined with a cutter so as to eliminate the unmolding taper on its side walls and obtain the desired dimensions.

Given that the width of the cavity 39 is much greater than the width of the inlet opening 9 to the fluidic oscillator as shown in FIG. 1, it is possible to use a cutter that is more robust than in the prior art for performing this machining operation, e.g. a cutter having a diameter of 25 mm.

The risks of damaging the cutter are thus avoided, and the length of time required for the machining operation is considerably reduced compared with the prior art.

In addition, the side walls can be machined over their full height without difficulty.

It should also be observed that this machining operation can be performed in fairly "approximate" manner since the dimensions obtained after machining the side walls adjacent to the cavity 39 are not final dimensions facing the flow of fluid, as explained below.

As a result, the time required for machining can be further reduced if approximate machining suffices.

Figure 5:
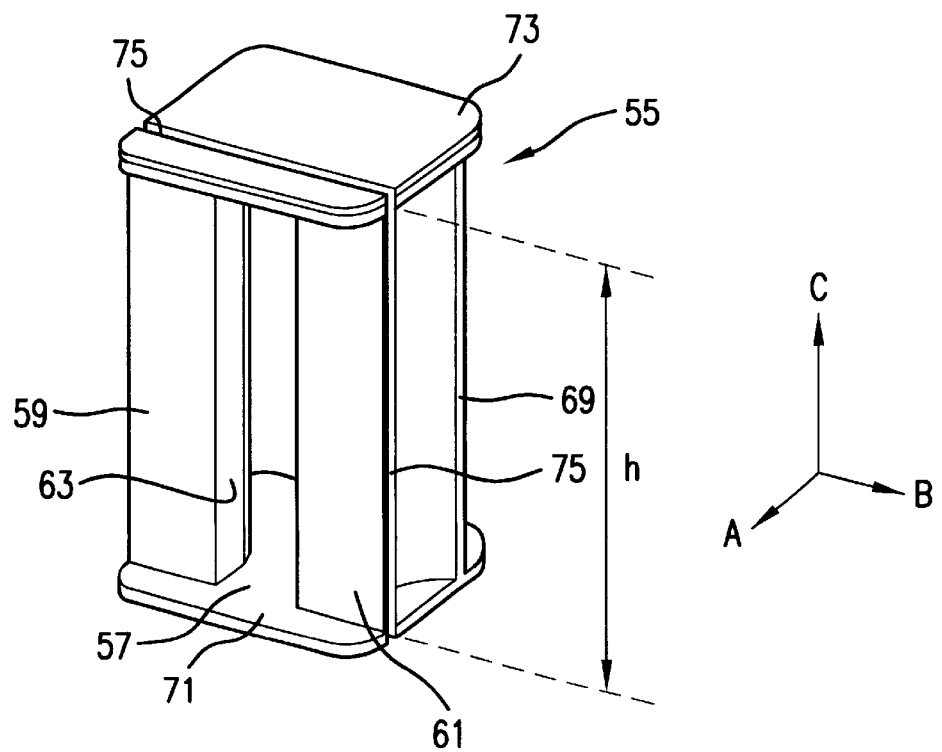
FIG. 5 is a perspective view on a larger scale on the insert 55 shown in FIG. 4.

As shown in perspective in FIG. 4 and in FIG. 5, an insert 55 is designed to be inserted in the cavity 39 between the portions 47 and 49 of the side walls 41 and 43, and the width d of the cavity is slightly greater than the width of said insert.

Figure 6:
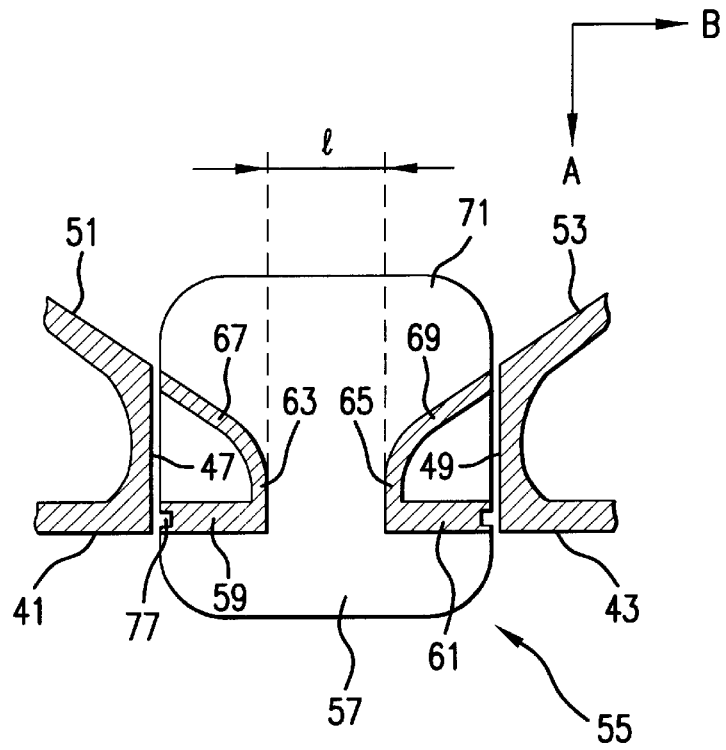
FIG. 6 is a view of the insert 55 in section on a plane parallel to the plane defined by the direction A and B in FIG. 4.

This insert is also shown in FIG. 6 in section on a plane containing the directions A and B, in a position where it is inserted between the wall portions 47 and 49. The width of the insert 55 can be 60 mm, for example, while the dimension d is equal to 61 mm, for example.

The insert 55 has two side walls which are elongate in the third direction C and which are spaced apart along the second direction B so as to define a narrow slot 57 between them.

This slot constitutes the inlet opening which is in alignment with the outlet opening 45 along the first direction A, and it enables the fluid flow to be transformed into a jet penetrating into the oscillation chamber 27.

As shown in FIG. 6, each of the side walls of the insert 55 has a respective portion 59 or 61 in alignment with the corresponding side wall 41, 43 of the enclosure, and between them these portions define the width l of the slot 57, which is equal to 19 mm, for example.

The side walls of the insert 55 also include respective mutually parallel portions 63 and 65 that are also parallel to the plane P and that define the longitudinal dimension or length of the slot 57, and also two portions 67 and 69 which splay apart from the plane P in inclined manner relative to the directions A and B so as to run into the walls 51 and 53 of the passages 31 and 33.

The insert 55 has two endpieces 71 and 73 implemented in the form of flat plates extending perpendicularly to the third dimension C, and located at the two opposite ends of the side walls of said insert so as to define the height of the slot 57 between said endpieces, which height corresponds to the dimension h.

As shown in FIG. 5, each endpiece is of small thickness or height, and the bottom wall 38 of the central block 23 has a shallow setback in register with the cavity 39 (FIG. 4) of a height that corresponds to the thickness of the endpiece 71.

In similar manner, a setback of height corresponding to the thickness of the endpiece 73 is provided in the cover (not shown) of the central block 23.

In addition, the insert 55 has a groove 75 formed in a peripheral zone of said insert and contained in a plane that extends transversely to the plane P (FIG. 4).

This groove is designed to receive a sealing gasket 77 (shown in FIG. 6) which is mounted in the groove before the insert 55 is inserted in the cavity 39.

FIG. 6 shows that the gasket 77 co-operates with the side wall portions 47 and 49 of the enclosure 25 so as to ensure that the fluid flow takes place via the slot 57 and does not infiltrate into the oscillation chamber between said portions 47, 49 and the insert 55.

The gasket 77 also co-operates with the bottom wall 38 of the central block and, in a manner not shown in the figures, with the cover of said central block.

Figure 7:
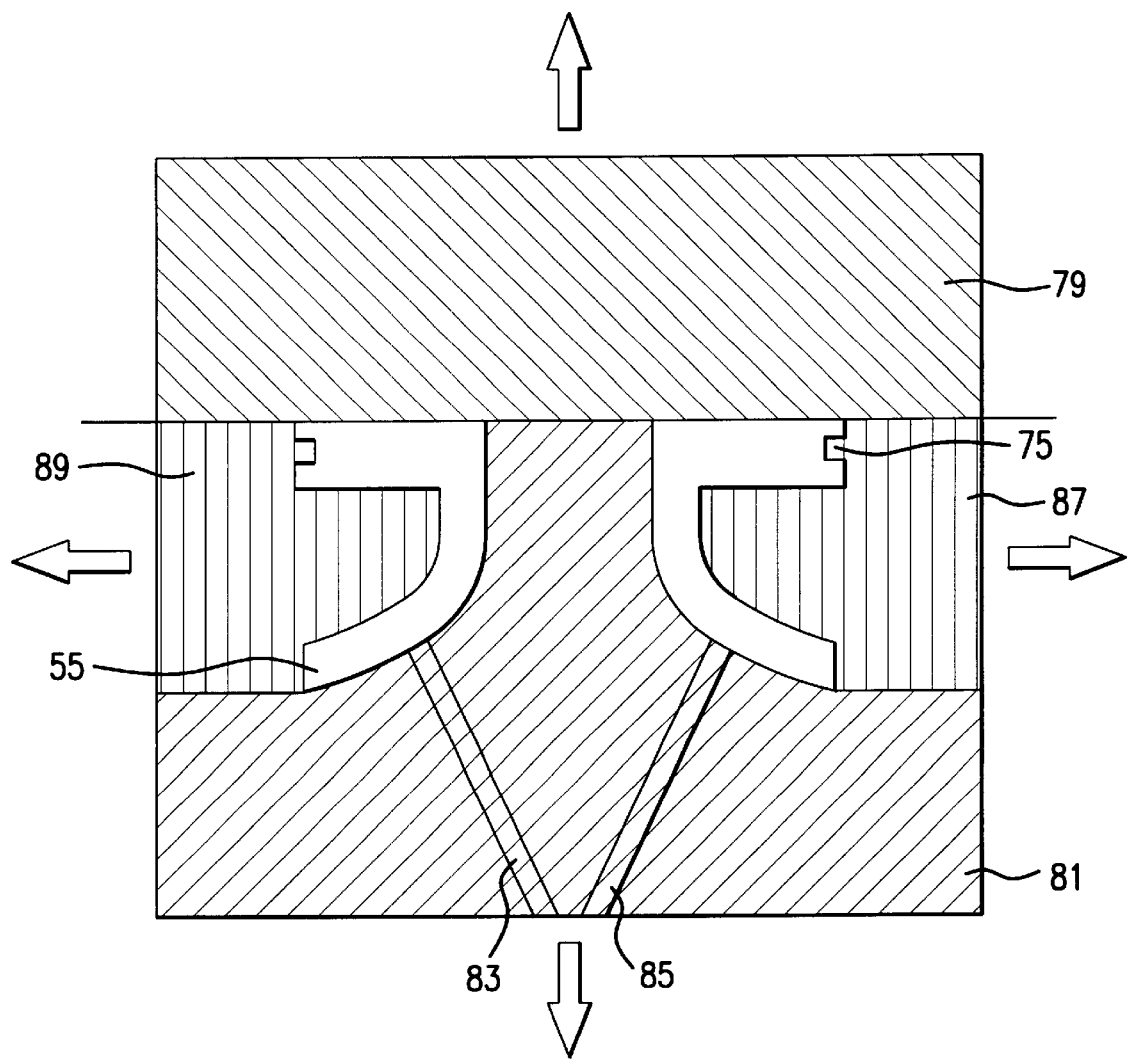
FIG. 7 shows the insert 55 in section in the plane of FIG. 6 inside the mold for manufacturing it.
Figure 8:
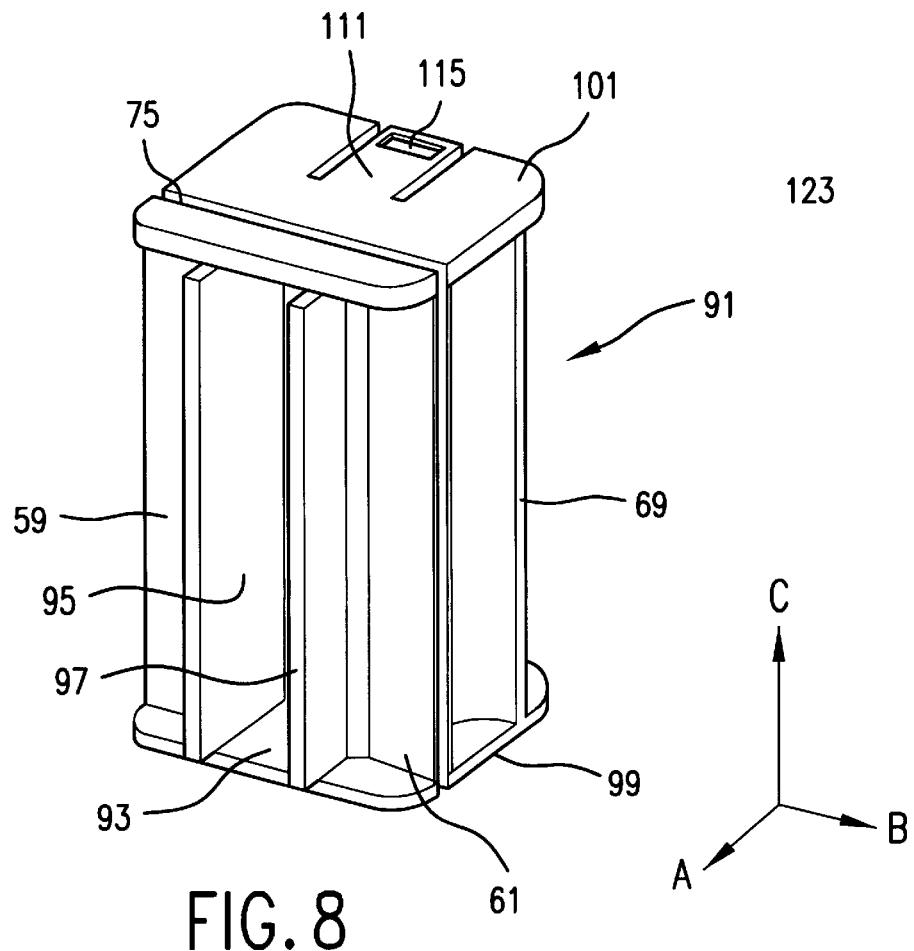
FIG. 8 is a perspective view of another embodiment of the insert 55 of FIG. 5.
Figure 9:
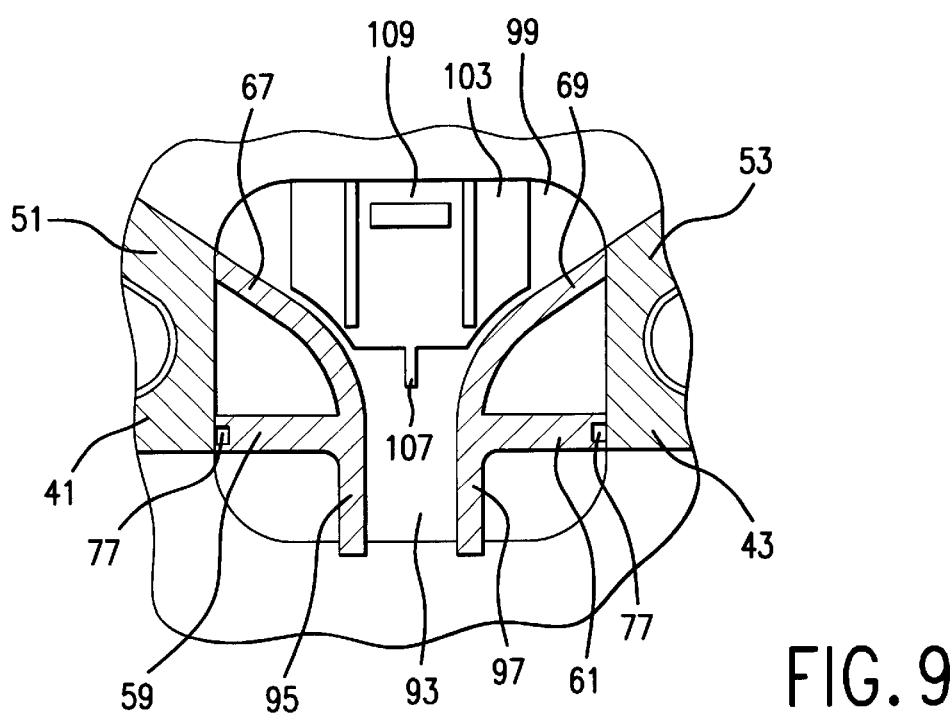
FIG. 9 is a view of the insert 91 of FIG. 8 in section in a plane parallel to the plane defined by the directions A and B of FIG. 4.
Figure 10:
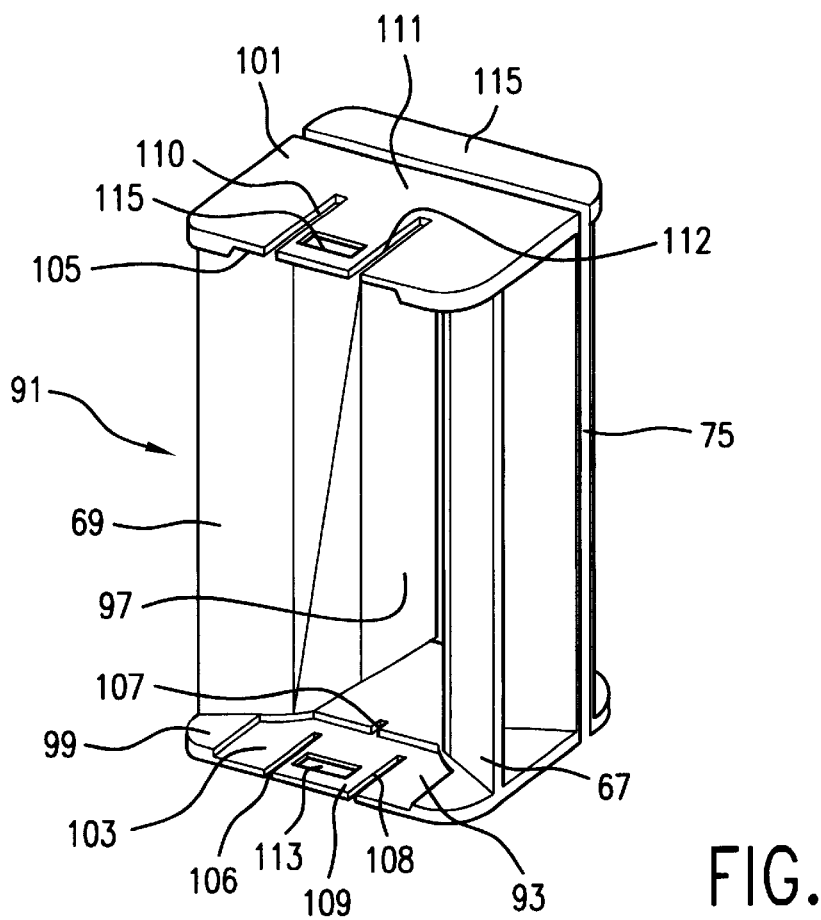
FIG. 10 shows the insert 91 of FIG. 8 in a perspective view from behind on a larger scale.

The insert 55 is made of plastics material, for example, by molding and unmolding, using an injection mold of the kind shown in FIG. 7 where said insert can be seen in section on a plane parallel to that of FIG. 6.

The mold comprises two mold cavity plates 79 and 81, one of which, the plate 81, defines the inside shape of the slot 57 and has two channels 83 and 85 both serving to feed liquid material into the empty internal zones of said mold in which the insert 55 forms on solidifying.

The mold also has two mold slides 87 and 89 which define the outside shape of the insert 55 including the peripheral groove 75.

When molding is finished, the slides 87 and 89 and the mold cavity plates 79 and 81 are moved apart in the directions shown by the arrows and the insert 55 as unmolded in this way constitutes the final insert.

It is particularly important to control manufacturing tolerances for the insert 55 and also its surface state, since the metrological properties of the fluidic oscillator depend on the quality of the fluid jet that is formed on passing through said insert (constant section, jet centered relative to the obstacle, . . . ), and this jet quality depends directly on the manufacturing tolerances and on the internal surface state of the portions 63, 65, 67, 69, 71, and 73.

By way of example, the injection molding process makes it possible to obtain accuracy of the order of one-tenth of a millimeter on the dimensions of the insert 55 whereas accuracy of only about five-tenths of a millimeter is required in manufacturing the central block out of aluminum.

Another advantage associated with having an insert 55 that is separate from the enclosure lies in the fact that the method of manufacturing the insert 55 is repeatable and as a result the insert can be obtained with qualities that are repeatable over time, thereby having a positive influence on the metrological qualities of the fluidic oscillator.

The fact that the insert 55 is removable from the enclosure 25 and the central block 23 makes it possible not only to simplify maintenance, but also to interchange the insert 55 with a different insert having a slot of different width l, thus adapting it to a different range of flow rates.

For example, the insert 55 having the dimensions defined above gives rise to a head loss of 13 millibars (mbars) for a flow rate of 250 cubic meters per hour ($m^3/h$), and for the same head loss, it is possible to increase the flow rate up to 300 $m^3/h$ by increasing the width l accordingly (by about 10%).

The invention also has another advantage: given that the operations of manufacturing the insert 55 and the enclosure 25 (i.e. the central block 27) are separate, accidental damage to the insert 55 during manufacture does not spoil manufacture of the entire fluidic oscillator.

FIGS. 8 to 11 show another embodiment of the invention in which two additional independent characteristics have been added. In this embodiment, elements that are unchanged relative to FIGS. 4 to 7 retain the same references.

As can be seen in FIGS. 8 to 11, the removable insert 91 for including in the housing 39 of the central block 23 of the fluidic oscillator shown in FIG. 4 has two side walls that are elongate in the third direction C and that are spaced apart in the second direction B so as to define a narrow slot 93 between them.

The side walls of the insert 91 are made up of a plurality of portions: the portions 59, 61, 67, and 69 are identical to the portions of the insert 55 which have the same references, and two mutually parallel portions 95 and 97 which define the slot 93 proper and which project from the transverse plane in which the portions 59 and 61 and the walls 41 and 43 of the enclosure 25 are contained.

These two side wall portions 95 and 97 which extend inside the oscillation chamber 27 of the central block 23 form a protective screen for the jet of fluid against the appearance of high pressure turbulence situated in the zones defined by the portions 59, 95 on one side and 61, 97 on the other side, and which contribute to deflecting said jet excessively.

A fluidic oscillator provided with two side wall portions which extend into the oscillation chamber is described in French patent application No. 97/13145 filed on Oct. 17, 1997 by the Applicant.

In a manner analogous to that described for the insert 55, the insert 91 also has two identical endpieces 99 and 101 disposed at the two ends thereof. Each endpiece 99, 101 is fitted with a respective site 103, 105 situated upstream from the slot 93 and in the form of a portion set back relative to the remainder of the corresponding endpiece.

The two sites which are disposed vertically one above the other have respective rectangular shapes, with the exception of portions close to the walls 67 and 69 which follow the profile of said walls and which are extended in the direction A in the form of a groove 107 formed in the corresponding endpiece.

Each site has a central portion 109, 111 that is separated from the remainder of the site by two gaps 106, 108 and 110, 112 that are aligned in the direction A and that serve to define respective tongues.

Figure 11:
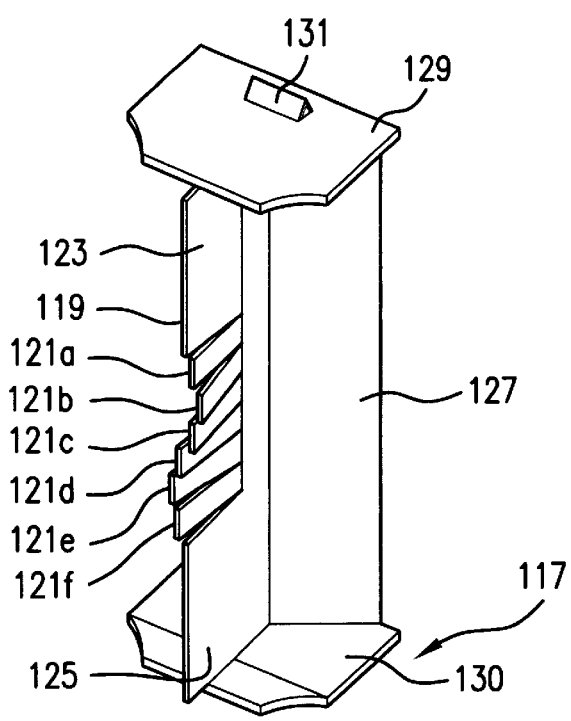
FIG. 11 is a perspective view of the element 117 for inserting in the insert 91 of FIGS. 8 to 10.

The tongues 109 and 111 have respective orifices 113 and 115 in vertical alignment with each other. An element 117 shown in perspective in FIG. 11 is in the form of a plane plate 119 having a plurality of substantially rectangular portions 121a–121f partially cut out from the remainder of said plate in the middle thereof.

The plate 119 has two plane portions 123, 125 at its ends bracketing the central portion, and the rectangular portions 121a to 121f extend at particular angles relative to the plane in which the plane portions 123, 125 extend.

The plate 119 is extended by a support 127 in the form of a right prism of triangular section having two end faces opposite said end plates 129, 130 and provided with respective studs 131.

The end plates 129, 130 are complementary in profile to the sites 103, 105.

The element 117 is designed to be inserted in the insert 91 at the sites 103, 105, being guided by the plates 129, 130 and the studs 131 which co-operate with the orifices 113, 115 so as to secure the element 117.

To enable the element 117 to be mounted in the insert 91, it is important to ensure that the tongues 109, 111 possess a degree of resilience.

Once the element 117 has been installed in the insert 91 it serves to modify the flow speed profile of the fluid upstream from the slot 93 by means of the portions 121a–121f which have an effect mainly on the central portion of the speed profile.

Such an element can be necessary when the flow coming from upstream is not fully controlled.

This element could equally well be fitted to the insert 55.

What is claimed is:

1. A method of manufacturing a fluidic oscillator that is symmetrical about a longitudinal plane of symmetry, the oscillator comprising an enclosure defining an oscillation chamber and having an inlet opening and an outlet opening through which the fluid flows and which are in alignment in said plane of symmetry in a "longitudinal" first direction, said inlet opening being made in the form of a slot which is narrow in a second direction extending transversely to said plane of symmetry and elongate in a third direction parallel to said plane of symmetry and perpendicular to said longitudinal first direction, wherein the method consists in making said enclosure by forming therein a cavity of transverse size greater than the transverse size of said slot, in manufacturing separately a removable insert with higher precision than the enclosure sand forming therein said slot, and in inserting said insert in said cavity.

2. A method according to claim 1, consisting in making the enclosure of the fluidic oscillator by operations of molding and unmolding and then machining the unmolded enclosure.

3. A method according to claim 1, consisting in making the insert by molding and unmolding operations.

4. A fluidic oscillator that is symmetrical about a longitudinal plane of symmetry, comprising an enclosure defining an oscillation chamber and having an inlet opening and an outlet opening through which the fluid flows and which are in alignment in said plane of symmetry in a "longitudinal" first direction, said inlet opening being made in the form of a slot that is narrow in a second direction extending transversely to said plane of symmetry and elongate in a third direction parallel to said plane of symmetry and perpendicular to said longitudinal first direction, wherein said slot is provided in an insert which is removable from said enclosure so that said insert can be manufactured separately and with higher precision than the enclosure.

5. A fluidic oscillator according to claim 4, in which the removable insert has two side walls elongate in the third direction and spaced apart in the second direction so as to define between them the dimension of said slot in said second direction, and also referred to as its width l.

6. A fluidic oscillator according to claim 5, in which the removable insert has two endpieces perpendicular to the third direction and located at the two opposite ends of said side walls so as to define between said endpieces the size of the slot in the third direction, also referred to as its height h.

7. A fluidic oscillator according to claim 6, in which two corresponding sites are formed respectively on each of the endpieces upstream from the slot for the purpose of receiving an element which is suitable for modifying the speed profile of the fluid flow upstream from said slot.

8. A fluidic oscillator according to claim 5, in which the removable insert is inserted in a cavity provided in the enclosure and of a transverse size d slightly greater than that of said insert, and in which the side walls of the removable insert run into respective walls of the enclosure via at least one of their portions and they also extend beyond said portions in the "longitudinal" first direction so as to project into the oscillation chamber.

9. A fluidic oscillator according to claim 4, which the removable insert is inserted in a cavity provided in the enclosure and of a transverse size d slightly greater than that of said insert.

10. A fluidic oscillator according to claim 9, in which the removable insert has a groove formed in a peripheral zone of said insert and contained in a transverse plane defined by the second and third directions, said peripheral groove being designed to receive a sealing member co-operating in particular with the walls of the enclosure which define the cavity.

11. A removable insert serving to transform a fluid flow into an oscillating jet of fluid for incorporating in a fluidic oscillator according to claim 4, the insert being characterized in that it comprises two side walls that are elongate in the third direction and that are spaced apart in the second direction perpendicular to the third direction in such a manner as to define a slot between them in said direction.

12. A removable insert serving to transform a fluid flow into an oscillating jet of fluid according to claim 11, having two endpieces perpendicular to the third direction and disposed at the two opposite ends of the side walls in such a manner as to define between said endpieces the size of the slot in said third direction.

13. A removable insert serving to transform a fluid flow into an oscillating jet of fluid according to claim 11, in which a groove is formed in a peripheral zone of said insert and is contained in a plane defined by the second and third directions, said groove being designed to receive a sealing member.

14. A removable insert serving a transform a fluid flow into an oscillating jet of fluid according to claim 11, in which the side walls extend in the first direction perpendicular to a plane defined by the second and third directions and in such a manner as to project into the oscillation chamber of the fluidic oscillator when said insert is incorporated therein.

* * * * *